Feb. 15, 1966 W. N. REESE 3,235,793
ELECTRONIC RECIPROCATOR FOR WELL LOGGING SYSTEMS
INCLUDING PHOTOELECTRIC FEEDBACK MEANS
Filed July 11, 1962
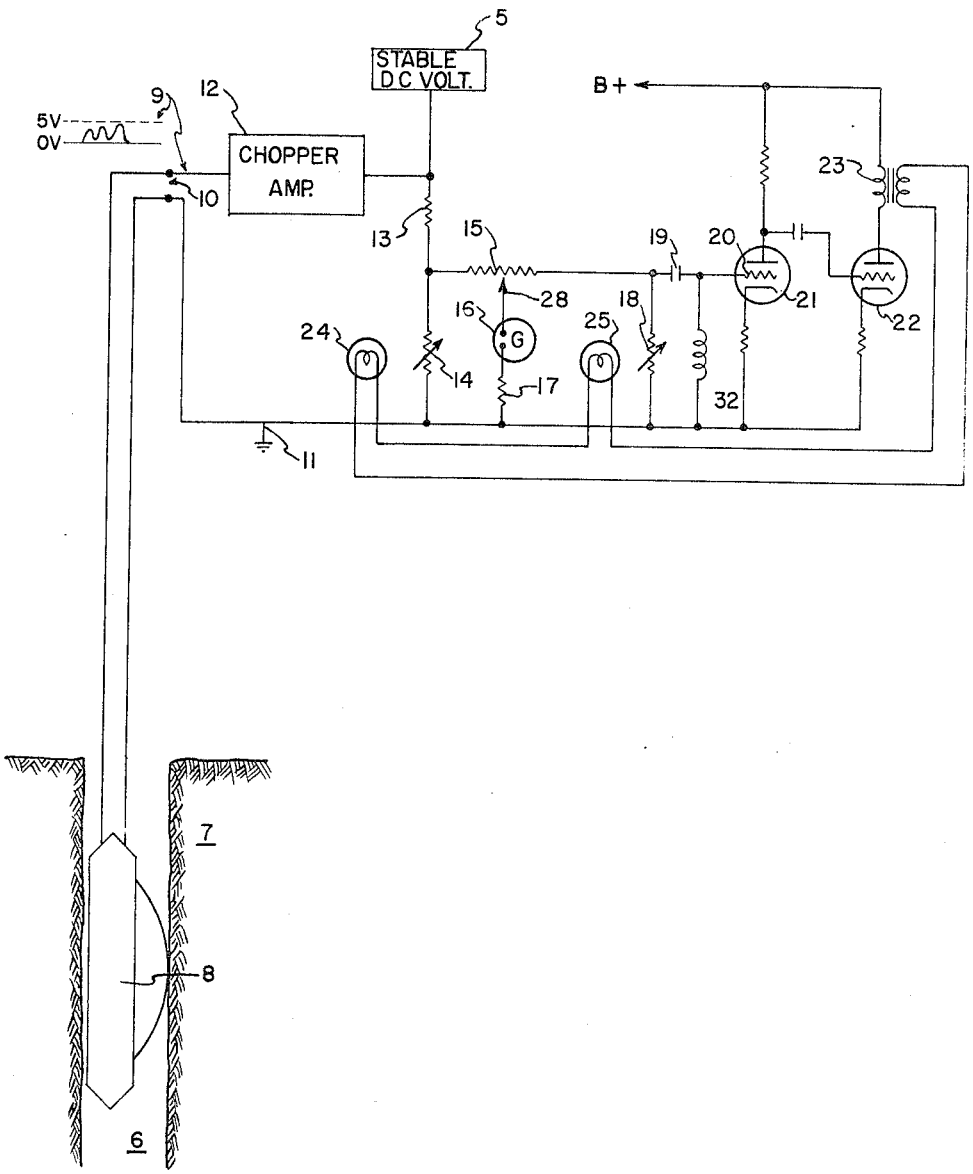
INVENTOR.
WILLIAM N. REESE
BY E. F. Bard
ATTORNEY

United States Patent Office 3,235,793
Patented Feb. 15, 1966

3,235,793
ELECTRONIC RECIPROCATOR FOR WELL LOG-GING SYSTEMS INCLUDING PHOTOELECTRIC FEEDBACK MEANS
William Nelson Reese, Houston, Tex., assignor to Dresser Industries, Inc., Dallas, Tex., a corporation of Delaware
Filed July 11, 1962, Ser. No. 209,181
3 Claims. (Cl. 324—1)

This invention relates to an improved electronic reciprocator for the conversion of an electronic signal to its reciprocal. The apparatus here described is particularly adapted for the conversion of the electrical signals encountered in well logging because of the very wide dynamic range of the signal from this apparatus. Further, it is oftentimes very desirable to compare a conductivity log with a resistivity log; hence, it is desirable to obtain the reciprocal function of the conductivity log. It further permits recording a resistivity curve from apparatus yielding conductivity signals.

Previous electro-mechanical devices to accomplish the conversion have had the disadvantages of slow response, high cost, short life of the mechanical components and limited dynamic range. Previous electronic reciprocators for this purpose have had the disadvantages of a tendency to oscillate at low frequencies, a lower dynamic range and limited accuracy.

Therefore it is an object of this invention to provide an electronic reciprocator with wide dynamic range.

A further object of this invention is to provide a stable electronic reciprocator in which the output signal is truly indicative of the reciprocal of the electrical input signal. A still further object of this invention is to provide an electronic reciprocator for well logging use which is highly accurate, yet relatively inexpensive.

Therefore in accordance with my invention I have provided a chopper amplifier modulated by a direct current signal, means feeding the output from the chopper amplifier through a photoconductive resistor network, means to maintain the output of said photoconductive resistor network at a constant voltage level, and means to vary a signal to said photoconductive resistor control in accordance with the direct current signal input, and means across said photoconductive resistor network to measure the output signal.

The invention itself may best be understood by reference to the following description in conjunction with the appended drawing in which FIGURE 1 is a diagram of my invention showing the invention adapted to indicate the reciprocal of a signal obtained from a logging apparatus. Conventional circuits are shown in block or simplified form.

Referring now to FIGURE 1, a relatively low value D.C. electrical signal 9 is shown applied at input terminals 10 coming from a well logging apparatus 8 designed to investigate the parameters of the formations 7 surrounding a well 6. One of these terminals is connected to ground 11, the other to a chopper amplifier 12. This chopper amplifier may be any suitable D.C. to A.C. converter. The variable electrical signal will rarely exceed 5 c.p.s. and the chopper amplifier is operated at a substantially higher frequency. A convenient frequency has been found to be 400 c.p.s. The output from chopper amplifier 12 is fed to one end of a resistor 13. Also supplied to the end of resistor 13 is a stabilized voltage from source 5. The other end of resistor 13 is connected to one lead of a photoconductive resistor 14. Also attached to this terminal is a variable resistance 15. The variable arm 28 from R15 is connected to an indicating device 16 here shown as a galvanometer which in turn is connected to a resistor 17 and thence to ground.

The remaining terminal on R15 is connected to a second photoconductive resistor 18 and also to a D.C. blocking capacitor 19. The other ends of photoconductive resistors 14 and 18 are connected to ground.

This cascade arrangement is not entirely necessary but it leads to a much wider dynamic range and to a substantially less critical selection of the photoconductive resistors and in the calibration of the electronic reciprocator. The other side of capacitor 19 is connected to the grid 20 of amplifier 21. Connected between the grid 20 and ground 11 is an inductance 32. This inductance 32 serves the dual purpose of providing a grid current return path to ground and also in conjunction with capacitor 19 provides increased stability of the voltage at the grid by eliminating spurious low frequency noise.

The output from amplifier 21 is fed to a second cascaded amplifier 22. The output from the second amplifier 22 is taken from a transformer 23 in the plate circuit and is then fed to the light sources 24 and 25 of the photoconductive resistors 14 and 18 respectively.

Thus it will be readily apparent to those skilled in the art that a slight change in voltage at grid 20 will result in a signal being fed to the light sources 24 and 25 of the photoconductive resistors 14 and 18, thereby causing a material change in the resistance of these resistors. This results in a tendency to restore the A.C. voltage on grid 20 to its previous level.

As with any servo-mechanism, of which this is the electrical equivalent, there will always be a small error and this will occur in slight variation in voltage at grid 20. However, this error in voltage can be made negligible by virtue of the present invention.

It will be apparent to those skilled in the art that the constant voltage supplied by the constant voltage supply 5 and the voltage supplied by the chopper amplifier 12 to the resistor 13 will result in a current flow through the photoconductive resistors 14 and 18 and the indicating device shown here as galvanometer 16. Any D.C. voltage across photoconductive resistor 18 will thus be measured by the galvanometer 16.

It will be seen that the D.C. voltage across the galvanometer 16 is the reciprocal of the D.C. input signal 9.

The photoconductive resistor network and its associated amplifiers which feed the light sources 24 and 25 are so constructed that the voltage at grid 20 is maintained approximately constant regardless of the amplitude of the input signal 9. This results because any change in the amplitude of the grid 20 results in a change of intensity of the lights 24 and 25 which in turn causes a change in the resistance of the photoconductive resistors 14 and 18 tending to bring the circuit back into balance. An increase in intensity of the light source results in a decrease in resistance of the photoconductive resistor. Accordingly, since output at the grid 20 stays constant, any change in the input signal 9 by a factor K will result in a change in gain of the network by a factor of 1/K.

The stable D.C. voltage flows through the same path of photoconductive resistor network as the A.C. signal and sees the same change in gain. The galvanometer 16 measures the D.C. difference in potential across photoconductive resistor 18; therefore, the indication of the galvanometer 16 is, in effect, the reciprocal of the input signal 9.

In practice this electronic reciprocator is particularly useful to change a conductivity signal from earth formations to a resistivity log. As has been previously indicated this is particularly useful since most logs on older wells are resistivity logs and it is oftentimes desirable to check a newly obtained conductivity log against older resistivity logs for purposes of obtaining more information about the formations surrounding the well 6 or for comparison of formations at corresponding depths in adjacent wells.

Of course, the circuit can be used when it is desirable to convert a resistivity log to a conductivity log.

As is well known to those skilled in the art the ratio of a resistivity to conductivity log may be obtained by imposing upon the constant voltage source 5 the input from the resistivity log while leaving the D.C. conductivity signal 9 on the input terminals 10.

Variations in the above described invention will be readily apparent to those skilled in the art such as the substitution of D.C. to A.C. converters for the chopper amplifier 12, the inclusion of additional filtering networks to filter out unwanted noise at various places in the circuit where noise might logically be expected to occur or where the signal input contains unwanted frequencies.

Therefore I do not desire to have my invention limited to the above descriptions, but rather only by the appended claims.

I claim:

1. In the well logging system having a D.C. signal varying with formation parameters, means for converting said varying D.C. signal to an alternating current signal, means to supply said alternating current signal to a photoconductive resistor network, comprised of a fixed resistor, a photoconductive resistor in series therewith and a light source in fixed relation to the photosensitive resistor so as to vary resistance of the photosensitive resistor inversely with intensity of the light source, means connected to the output of said photoconductive resistor network to supply a voltage varying in amplitude relative to the voltage at the output of the photoconductive resistor network to the light source so that upon change in such output voltage there will be a change in intensity of the light source and correspondingly a change in resistance of the photo-sensitive resistor to bring the network back into balance to maintain an approximately constant output voltage, a stable D.C. voltage source supplying a constant D.C. voltage to said photoconductive resistor network, and means indicating the D.C. potential across the photoconductive element which potential is proportional to the reciprocal of the varying D.C. input signal.

2. The apparatus specified in claim 1 including at least two photoconductivity resistors connected in cascade in said photoconductivity resistor network.

3. The apparatus specified in claim 1 including means connected in the output circuit of said photoconductivity resistor circuit to eliminate spurious noise.

References Cited by the Examiner

UNITED STATES PATENTS

| | | | |
|---|---|---|---|
| 3,024,658 | 3/1962 | Huddleston | 324—118 X |
| 3,070,306 | 12/1962 | DuBois | 235—194 X |
| 3,105,190 | 9/1963 | Norris | 324—6 |
| 3,110,813 | 11/1963 | Sack. | |

FOREIGN PATENTS 1,063,643  8/1959  Germany.

WALTER L. CARLSON, *Primary Examiner.*